(12) United States Patent
Chen

(10) Patent No.: US 10,775,565 B2
(45) Date of Patent: Sep. 15, 2020

(54) ADAPTOR FOR CONNECTING WITH A CABLE ASSEMBLY FOR CABLE MANAGEMENT AND AN INTEGRATED CABLE ASSEMBLY USING THE SAME

(71) Applicants: Cheng Sean Chen, Hsinchu (TW); BKS TEC CORP., Hsinchu (TW)

(72) Inventor: Cheng Sean Chen, Milpitas, CA (US)

(73) Assignees: Cheng Sean Chen, Hsinchu (TW); BKS TEC CORP., Hsinchu (TW)

( * ) Notice: Subject to any disclaimer, the term of this patent is extended or adjusted under 35 U.S.C. 154(b) by 0 days.

(21) Appl. No.: 16/383,661

(22) Filed: Apr. 15, 2019

(65) Prior Publication Data

US 2019/0235176 A1 Aug. 1, 2019

Related U.S. Application Data

(63) Continuation of application No. 15/782,863, filed on Oct. 13, 2017, now Pat. No. 10,310,189.

(60) Provisional application No. 62/491,276, filed on Apr. 28, 2017.

(51) Int. Cl.
| | |
|---|---|
| *G02B 6/38* | (2006.01) |
| *G02B 6/42* | (2006.01) |
| *H04B 10/2575* | (2013.01) |
| *G06T 19/00* | (2011.01) |

(52) U.S. Cl.
CPC .......... *G02B 6/3807* (2013.01); *G02B 6/381* (2013.01); *G02B 6/42* (2013.01); *G02B 6/428* (2013.01); *G02B 6/4292* (2013.01); *G02B 6/4293* (2013.01); *G06T 19/006* (2013.01); *H04B 10/25752* (2013.01); *G09G 2370/12* (2013.01)

(58) Field of Classification Search
None
See application file for complete search history.

(56) References Cited

U.S. PATENT DOCUMENTS

| | | | |
|---|---|---|---|
| 10,310,189 B2 * | 6/2019 | Chen | G02B 6/428 |
| 2008/0304304 A1 * | 12/2008 | Cheng | G06F 1/266 |
| | | | 363/146 |
| 2011/0286703 A1 * | 11/2011 | Kishima | G02B 6/4201 |
| | | | 385/88 |
| 2016/0112670 A1 * | 4/2016 | Majid | H04N 21/4183 |
| | | | 348/731 |
| 2017/0070776 A1 * | 3/2017 | Collins | H04N 21/60 |
| 2017/0318352 A1 * | 11/2017 | Penke | H04N 21/6125 |

* cited by examiner

*Primary Examiner* — Sung H Pak
(74) *Attorney, Agent, or Firm* — Min-Lee Teng; Litron Patent & Trademark Office

(57) ABSTRACT

An adaptor having a first HDMI interface for connecting with a first external device to receive data therefrom and a second interface for connecting with an HDMI connector of a cable assembly, wherein the cable assembly comprises a cable connected to the HDMI connector and the cable comprises at least one fiber wire, wherein the adaptor comprise at least one processor and a wireless device, wherein the at least one processor is capable of communicating with a second external device via a wireless connection between the wireless device and the second external device to perform operations associated with the transmission of the at least one fiber wire or said data received from first external device.

18 Claims, 4 Drawing Sheets

ADAPTOR FOR CONNECTING WITH A CABLE ASSEMBLY FOR CABLE MANAGEMENT AND AN INTEGRATED CABLE ASSEMBLY USING THE SAME

CROSS-REFERENCES TO RELATED APPLICATIONS

This application is a continuation of U.S. application Ser. No. 15/782,863 filed on Oct. 13, 2017, which claims the benefit of U.S. Provisional Patent Application No. 62/491,276 filed on Apr. 28, 2017, which is incorporated by reference herein and made a part of specification.

BACKGROUND OF THE INVENTION

I. Field of the Invention

The present invention relates to a cable assembly, and in particular, to a cable assembly capable of managing the cable or data delivered through the cable assembly.

II. Description of the Prior Art

In recent years, fiber cable has been widely used for transmitting video signals or other high data rate signals. However, it is difficult to manage or control the transmission of optical fibers inside the fiber cable when it is operating.

Furthermore, it is difficult to enhance features of video data transmitted in the fiber cable for certain applications without changing the devices connected by the cable assembly.

Accordingly, the present invention proposes a better way to design an adaptor and a corresponding cable assembly to overcome the above-mentioned problems.

SUMMARY OF THE INVENTION

One objective of the present invention is to provide an adaptor that can plug to one end of an HDMI optical fiber cable, and one end to any HDMI compatible devices. Once plugged in, the adaptor can communicate with an application (APP) running on a remote device through a wireless connection to manage the cable or enhance features of video data received from a video source device.

One objective of the present invention is to provide a cable assembly having a connector that can communicate with an application (APP) running on a remote device through a wireless connection to manage the cable or enhance features of video data received from a video source device.

One embodiment of the present invention is to provide an adaptor to connect with a first connector of a cable assembly, wherein the cable assembly comprises a cable connected to the first connector, and the cable comprises at least one fiber wire, wherein the adaptor comprises a first interface for connecting with a first external device to receive data therefrom; a second interface for connecting with the first connector of a cable assembly; and at least one circuit board, wherein a plurality of devices are disposed on the at least one circuit board to form a circuitry, wherein the circuitry comprises at least one processor and a wireless device, wherein the at least one processor is capable of communicating with the second external device via a wireless connection between the wireless device and the second external device to perform operations associated with the transmission of the at least one fiber wire or said data received from the first external device.

In one embodiment, the second external device is a mobile device, wherein an application (APP) running on the mobile device communicates with the at least one processor via the wireless connection.

In one embodiment, the adaptor conforms to a standard HDMI connector.

In one embodiment, the adaptor conforms to a standard HDMI connector to receive video data from the first external device, and the circuitry comprises an HDMI signal sensor for determining a transfer rater of the video data.

In one embodiment, the circuitry comprises a power management device, wherein the power management device for managing the power of the adaptor and the cable assembly.

In one embodiment, the at least one circuit board is a printed circuit board (PCB).

In one embodiment, the cable comprises at least one first fiber wire to transfer video data and at least one second fiber wire to transfer visible lights, wherein the first connector of the cable assembly comprises a first LED, wherein the APP sends a command to the at least one processor via the wireless connection to turn on the first LED to light up the cable.

In one embodiment, when the adaptor connects with the cable assembly to form a connection from a video source device to a display device, the APP lights up the cable and shows the working status of the connection.

In one embodiment, the first external device is a game console and a second connector of the cable assembly connects with a display device.

In one embodiment, the at least one processor is capable of decoding the video data to enable parental control on whether to transmit the video data to the cable or not.

In one embodiment, the at least one processor is further capable of adding video frames to enhance features for playing 3D or VR (Virtual Reality) video.

In one embodiment, the APP running on the mobile device collects usage of the video data and storing said usage of the video data in remote servers.

In one embodiment, the APP is capable of transferring said data to a remote server.

In one embodiment, the at least one processor and the wireless device are integrated into a single IC.

One embodiment of the present invention is to provide a cable assembly, wherein the cable assembly comprises: a cable comprising at least one fiber wire; and a first connector connected to the cable, wherein the first connector comprises a first interface for connecting with a first external device to receive data therefrom; and at least one circuit board, wherein a plurality of devices are disposed on the at least one circuit board to form a circuitry, wherein the circuit comprises at least one processor and a wireless device, wherein the at least one processor is capable of communicating with a second external device via a wireless connection between the wireless device and the second external device so as to perform operations associated with the transmission of the at least one fiber wire or said data received from the first external device.

In one embodiment, the second external device is a mobile device, wherein an application (APP) running on the mobile device communicates with to the at least one processor via the wireless connection.

In one embodiment, the first connector conforms to a standard HDMI connector to receive video data from the first external device, and the circuitry further comprises an HDMI signal sensor for determining a transfer rater of the video data.

In one embodiment, the first external device is a game console and a second connector of the cable assembly connects with a display device.

In one embodiment, the at least one processor is capable of decoding the video data to enable parental control on whether to transmit the video data to the cable or not.

In one embodiment, the at least one processor is further capable of adding video frames to enhance features for playing 3D or VR (Virtual Reality) video.

In one embodiment, the first external device is a mobile device such as a mobile phone, a PAD or a notebook.

The detailed technology and above preferred embodiments implemented for the present invention are described in the following paragraphs accompanying the appended drawings for people skilled in the art to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF THE INVENTION

The detailed explanation of the present invention is described as follows. The described preferred embodiments are presented for purposes of illustrations and descriptions, and they are not intended to limit the scope of the present invention.

First Embodiment

A first embodiment of the present invention discloses an adaptor for connecting with a connector of an HDMI cable assembly that links two devices such as a game console and a display device through a fiber cable. The adaptor comprises at least one processor for managing and enhancing functions for the HDMI cable assembly. The enhanced functions include, but not limited to, customizing visible lighting, detecting video quality and resolution, enabling/disabling signal transmitting, parenteral control, enhancing video and audio quality and features (such as 3D and VR), etc. The adaptor also comprises a wireless device, such as WIFI or Bluetooth device, for communicating with a remote application (APP) on any wireless devices, such as a mobile phone or a tablet computer. In the real production phase, the adaptor can have a different combination of features as different models.

Figure 1A:
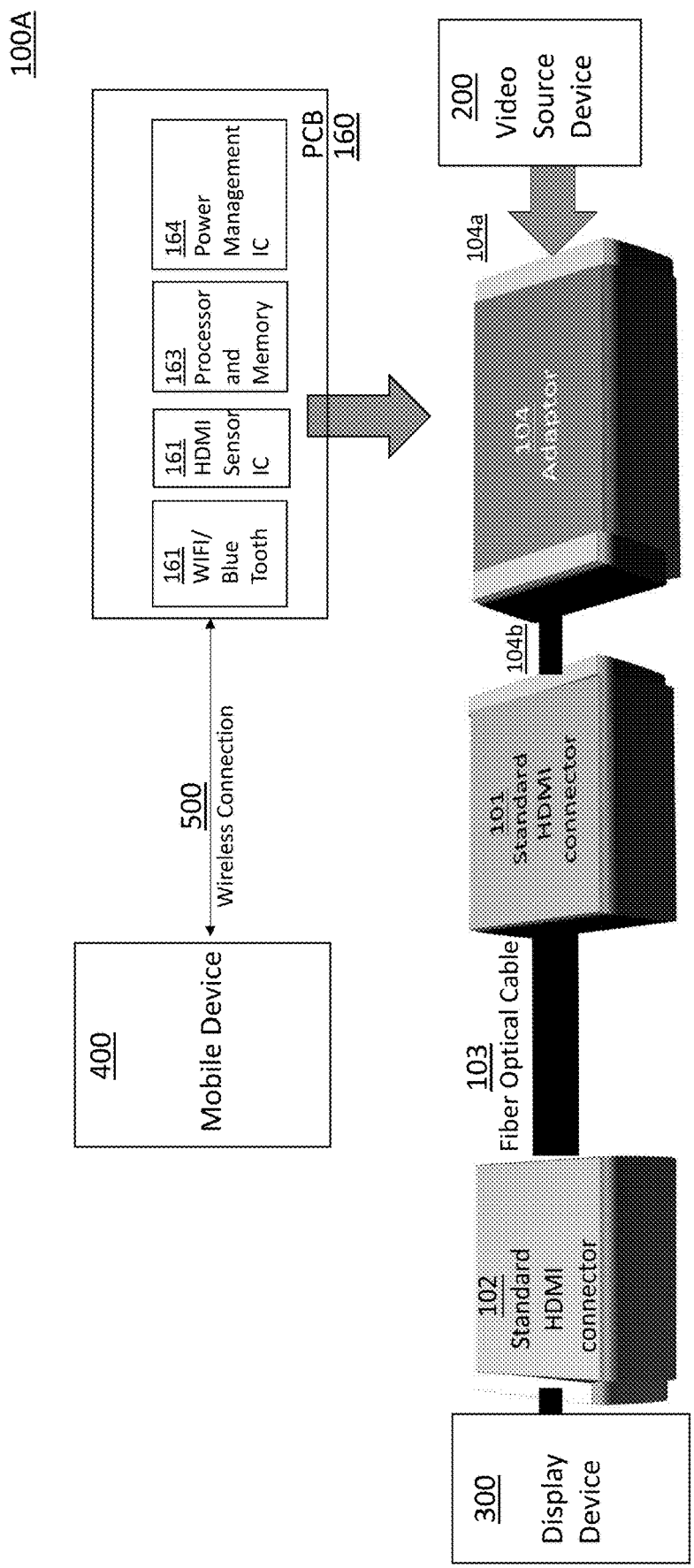
FIG. 1A illustrates a perspective view of a cable assembly and an adaptor plugged into a connector of the cable assembly for managing the cable according to first embodiment of present invention, wherein the adaptor is connected to a video source device.

Please refer to FIG. 1A, which illustrates a perspective view 100A of a cable assembly and an adaptor 104 that can connect with a connector 101 of the cable assembly. The cable assembly can have two connectors, such as standard HDMI connectors 101, 102, connected by an optical fiber cable 103. The optical fiber cable 103 can include at least one first fiber wire for transmitting data such as video data. The connector 101 of the cable assembly includes an electrical-to-optical converting circuit for converting electrical signals to optical signals for transmitting to the at least one first fiber wire of the optical fiber cable 103. In one embodiment, the optical fiber cable 103 can include at least one second fiber wire to transmit visible lights and the connector 101 of the cable assembly can include LED(s) to emit visible lights to the at least one second fiber wire of the optical fiber cable 103. Each LED can be an RGB LED for generating colorful lights.

As shown in FIG. 1A, the adaptor 104 has a first interface 104a and a second interface 104b, wherein the first interface 104a can be connected to a first external device such as a video source device 200, such as a set top box or a game console, and the second interface 104b can be connected to the connector 101 of the cable assembly. The first external device such as a video source device 200 can send video data to a display device 300, such as a television or a monitor, through the adaptor 104 and the cable assembly. The adaptor 104 includes at least one circuit board such as a printed circuit board (PCB) 160, and a plurality of devices is disposed on the printed circuit board (PCB) 160 to form a circuitry that includes a wireless device, such as WIFI/BT (Blue Tooth) wireless device 161 and at least one processor and memory devices 163. The at least one processor is capable of communicate with an application (APP) running on a mobile device, such as a mobile phone or a tablet computer, through a wireless connection 500 to performing operations associated with the at least one first fiber wire of the optical fiber cable 103 or the data received from the first external device. For example, the adaptor can determine whether to transmit the video data received from the video source device 200 to the optical fiber cable 103 or not, which means the adaptor can block certain video transmission to the optical fiber cable 103 if certain conditions are met. The adaptor can also perform some operations on the video data received from the video source device 200 to enhance or add features to the video data so that the display device 300 for displaying 3D or VR (Virtual Reality) video can use the video data. Please note that the present invention is not limited to the implementations of the circuitry. The at least one processor and memory devices 163 and the wireless device 161 can be integrated into a single IC or any combination of the devices on the PCB board 160 can be integrated into a single IC.

In one embodiment, the at least one processor is able to perform decoding the video signal for enabling parental control on whether the video can be transmitted to the optical fiber cable 103 or not. In one embodiment, the at least one processor is able to enhance the video quality or adding video frames to enhance features for playing 3D and VR (Virtual Reality) video. The APP running on the mobile phone can have full control of the adaptor as well as the optical fiber cable 103. In one embodiment, the APP running on the mobile phone can collect a more global usage of the data and stored in remote servers. In one embodiment, the circuitry can also include an HDMI sensor IC 162, which is able to determine video data transfer rate and other video parameters. In one embodiment, the circuitry can also include power management IC(s) for performing power management for the cable assembly.

In one embodiment, when the connection from the video source device 200 to the display device 300 is established, the optical fiber cable 103 will light up, and in the meantime, the APP will show the working status of the connection. The color of the light, time length and light pattern can be adjusted by controlling the LED(s) or RGB LED(s) in the connector 101 of the cable assembly. For example, whenever the video source device 200, such as a game console, starts to transmit video to the display device 300, such as a TV, the optical fiber cable 103 will light up again with different color, wherein the color can be different depends on the video resolution data rate (such as 4K or 8K), and the color can be customized for each cable. Likewise, a user can turn on the APP on the mobile device 400, and it will show the current video title being played and its video data rate. The user can also use the APP to change the default color to any different color for each video data rate, and the coloring of the optical fiber cable 103 will change accordingly, wherein the time length and light pattern of the coloring of the optical fiber cable 103 can be customized. Whenever the video stops transmitting, the optical fiber cable 103 will stop the lighting and the APP will show no data rate. On the APP, you can also check all of the historical data on which video being played and the video transfer rate, based on the hourly, daily, weekly even yearly.

In APP running on the mobile device 400, a user can also configure some advanced features such as video enhancing and parental control, for example, if user enables video enhancing to VR, the adaptor 104 will process the video signal to VR and transmit it to the TV, without changing original video, and the basic video parameters, such as brightness, contrast and hue, can be modified and enhanced. If the user enables parental control, any video containing contents over mature rating set will not be transmitted to the optical fiber cable 103 even the video source device 200 such as the game console is still transmitting the video. All those enhanced features can correspond to a specific color lighting in the optical fiber cable 103 to indicate such features is enabled. The adaptor 104 can cease the video data transmission as the user desired, even when the video source device 200 such as the game console is still transmitting the video. It can be implemented as copyright protected cable using the same function. Even user is not at home, through the remote APP, the user can monitor whether the video is being transferred and which content is being played, in real time, or any time later.

Figure 1B:
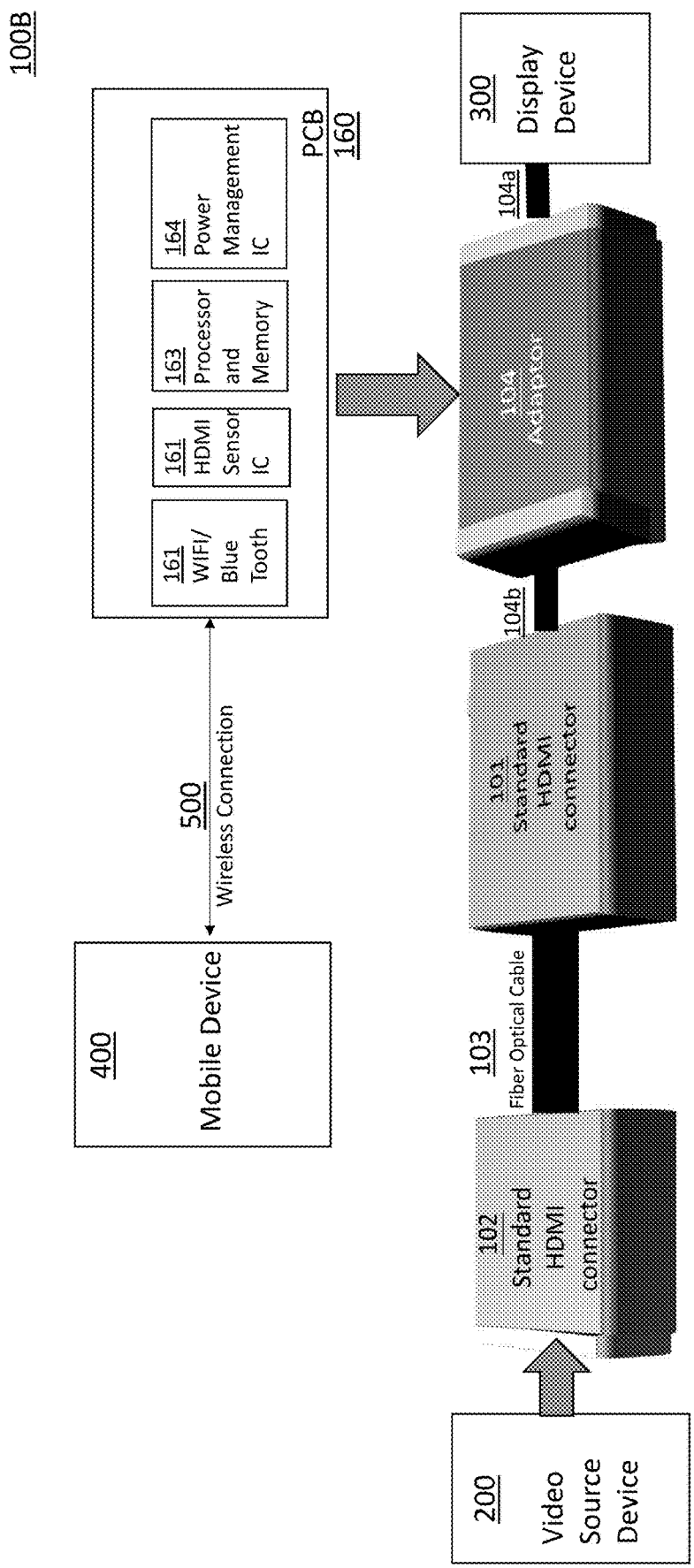
FIG. 1B illustrates a perspective view of a cable assembly and an adaptor plugged into a connector of the cable assembly for managing the cable according to first embodiment of present invention, wherein the adaptor is connected to a display device.

Please refer to FIG. 1B, which illustrates a perspective view 100B of a cable assembly and an adaptor 104 that can connect with a connector 101 of the cable assembly. The cable assembly can have two connectors, such as standard HDMI connectors 101, 102, connected by an optical fiber cable 103. The optical fiber cable 103 can include at least one first fiber wire for transmitting data such as video data. The connector 102 of the cable assembly includes an electrical-to-optical converting circuit for converting electrical signals to optical signals for transmitting to the at least one first fiber wire of the optical fiber cable 103. In one embodiment, the optical fiber cable 103 can include at least one second fiber wire to transmit visible lights and the connector 101 of the cable assembly can include LED(s) to emit visible lights to the at least one second fiber wire of the optical fiber cable 103. Each LED can be a RGB LED for generating colorful lights.

The difference between the FIG. 1B and FIG. 1A is that the video source device 200 and the display device 300 in FIG. 1A are swapped in FIG. 1B, however, the at least one processor is still able to perform operations associated with the transmission of the fiber wires inside the cable as described for FIG. 1A. For example, the cable can include metal wires for allow the at least one processor to send commands or control signals to the connector 102 through the metal wires for controlling the operations inside the connector 102. In FIG. 1B, the connector 101 can have LED or RGB LED to emit visible lights to the cable, and the at least one processor can send command or control signal to the connector 101 to turn on the LED or RGB LED inside the connector 101. Other operations described in FIG. 1B can be achieved in a similar way as in FIG. 1A, and therefore it will not be described further, Second Embodiment A second embodiment of the present invention discloses a cable assembly comprising a connector capable of managing and enhancing functions for the HDMI optical fiber cable. The enhanced functions include, but not limited to, customizing visible lighting, detecting video quality and resolution, enabling/disabling signal transmitting, parenteral control, enhancing video and audio quality and features (such as 3D and VR), etc.

Figure 2A:
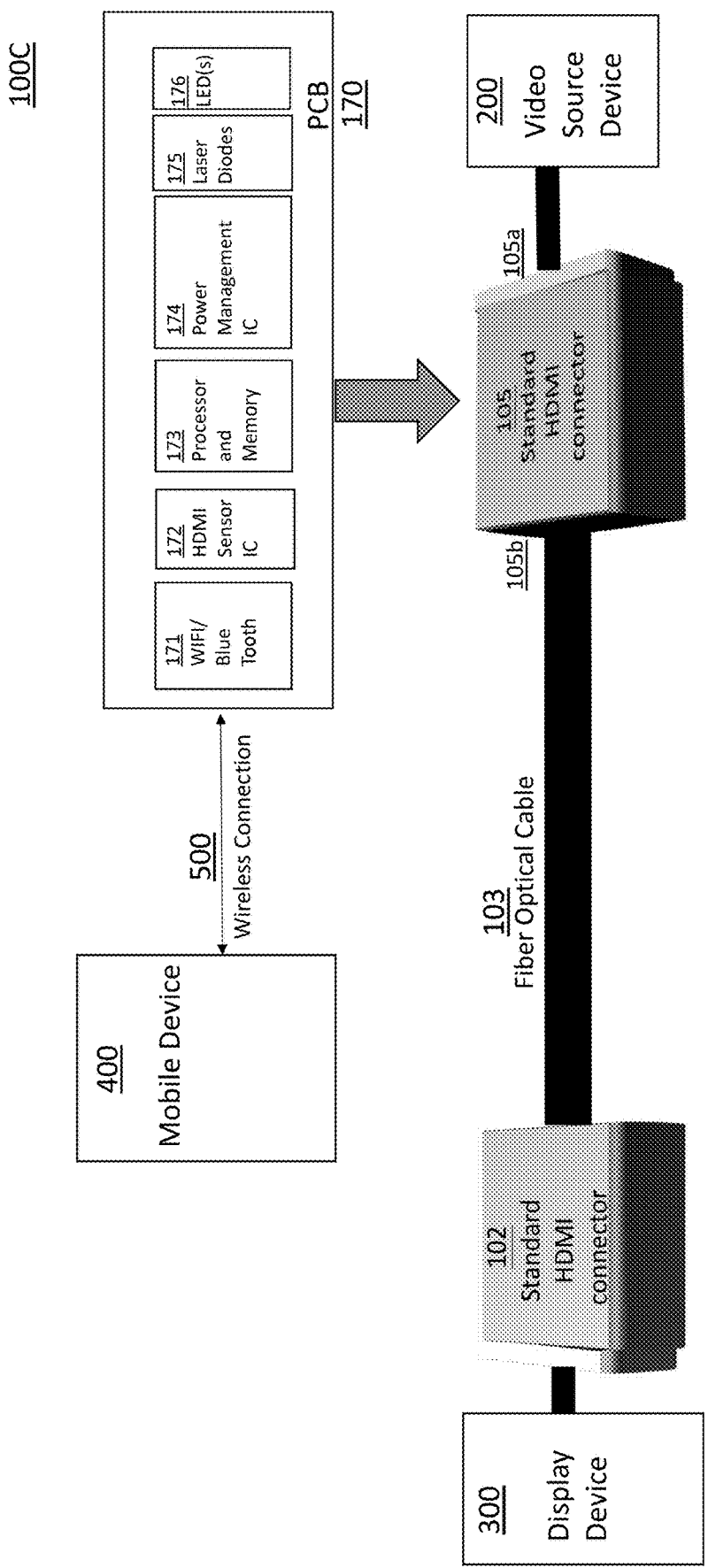
FIG. 2A illustrates a perspective view of a cable assembly that has a connector capable of managing the cable according to second embodiment of present invention, wherein the connector is connected to a video source device.

Please refer to FIG. 2A, which illustrates a perspective view 100C of a cable assembly. The cable assembly can have two connectors such as standard HDMI connectors 101, 105 connected by an optical fiber cable 103. The optical fiber cable 103 can include at least one first fiber wire for transmitting data such as video data. The connector 105 includes a first interface 105a and a second interface 105b, wherein the first interface 105a connects to a first external device such as a video source device 200, such as a set top box or a game console, and the second interface 105b connects to the optical fiber cable 103. The video source device 200 can send data to display device 300 through the cable assembly. The connector 105 comprises a printed circuit board (PCB) 170, wherein a plurality of devices is disposed on the printed circuit board (PCB) 170 to form a circuitry. The circuitry comprises an electrical-to-optical circuit including laser diodes 175 to transmit optical signal to at least one fiber wire of the optical fiber cable 103, a wireless device, such as WIFI/BT (Blue Tooth) wireless device 171 and at least one processor and memory 173. In one embodiment, the optical fiber cable 103 can include at least one second fiber wire to transmit visible lights and the connector 105 of the cable assembly can include LED(s) or RGB LED(s) 176 to emit visible lights to the at least one second fiber wire of the optical fiber cable 103. The at least one processor is capable of communicate with an application (APP) running on a mobile device such as a mobile phone or a tablet computer through a wireless connection 500 to performing operations on the fiber wires of the optical fiber cable 103 or the data received from the first external device. Please note that the present invention is not limited to the implementations of the circuitry. The at least one processor and memory devices 173 and the wireless device 171 can be integrated into a single IC or any combination of the devices on the PCB board 170 can be integrated into a single IC.

In one embodiment, the at least one processor is able to perform decoding the video signal to enable parental control on whether the video can be transmitting or not, and the at least one processor can further enhance the video quality or adding video frames to enhance features for playing 3D and VR (Virtual Reality) video. The APP running on the mobile phone can have full control of the adaptor and the optical fiber cable 103. In one embodiment, the APP running on the mobile phone can collect a more global usage of the data and stored in remote servers. In one embodiment, the circuitry can also include and an HDMI sensor IC 172, which is able to determine video data transfer rate and other video parameters. In one embodiment, the circuitry can also include power management IC(s) for performing power management for the adaptor or the cable assembly.

In one embodiment, when the connection from the video source device 200 to the display device 300 is established, the optical fiber cable 103 will light up, and in the meantime, the apps will show the working status of the connection. The color of the light, time length and light pattern can be changed. For example, whenever the game console start to transmit video to the TV, the optical fiber cable 103 will light up again with different color, wherein the color can be different depends on the video resolution data rate (such as 4K or 8K), and the color can be customized for each cable. Likewise, the user can open the APP, and it will show the current video title being played and its data rate. You can also change the default color to any different color for each video data rate, and it will change the color lighting of the optical fiber cable 103, wherein the time length and light pattern of the color lighting of the optical fiber cable 103 can be customized. Whenever the video stops transmitting, the optical fiber cable 103 will stop the lighting and the APP will be showing no data rate. On the APP, you can check all of the historical data on which video being played and the video transfer rate, on the hourly, daily, weekly even yearly.

In APP, a user can configure the advanced features, such as video enhancing and parental control. If the user enables video enhancing to VR, for example, the connector 105 of the cable assembly will process the video signal to VR and transmit it to TV, without the need of changing original video, and the basic video parameters, such as brightness, contrast and hue, can be modified and enhanced. If the user enables parental control, any contents over mature rating set, the video will not transmit even the game or video is playing. All those enhanced features can also have a specific color in the cable to indicate such features is enabled. The connector 105 of the cable assembly has a function to cease the data transmission as the user desired, even when the game console is still transmitting the video. It can be implemented as copyright protected cable using the same function. Even the user is not at home, through the remote APP, the user can monitor whether the video is being transferred and which content is being played, in real time, or any time later.

Figure 2B:
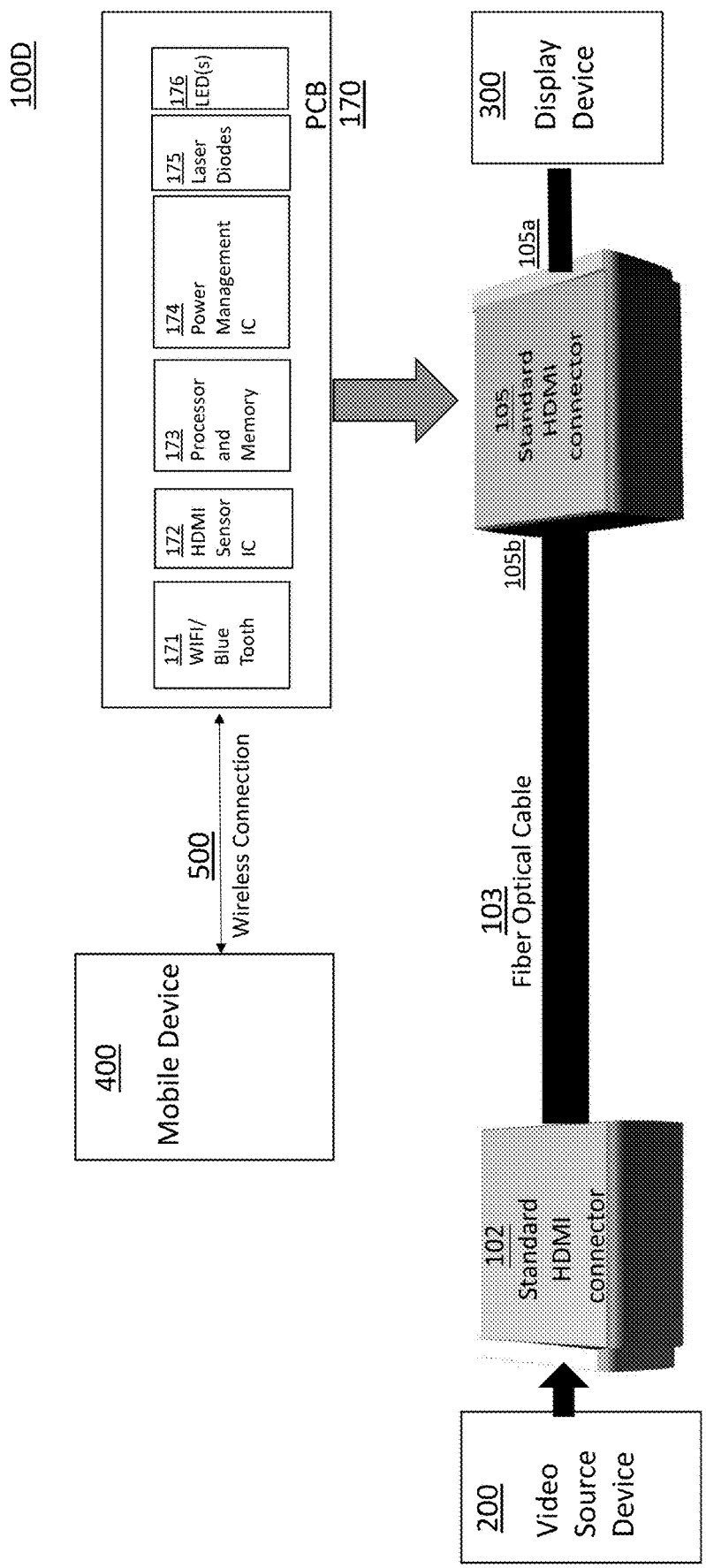
FIG. 2B illustrates a perspective view of a cable assembly that has a connector capable of managing the cable according to second embodiment of the present invention, wherein the connector is connected to a video source device.

Please refer to FIG. 2B, which illustrates a perspective view 100D of a cable assembly. The cable assembly can have two connectors such as standard HDMI connectors 101, 105 connected by an optical fiber cable 103. The optical fiber cable 103 can include at least one first fiber wire for transmitting data, such as video data. The connector 105 includes a first interface 105a and a second interface 105b, wherein the first interface 105a connects to a first external device, such as a display device 300, and the second interface 105b connects to the optical fiber cable 103.

The difference between the FIG. 2B and FIG. 2A is that the video source device 200 and the display device 300 in FIG. 2A are swapped in FIG. 2B, however, the at least one processor is still able to perform operations associated with the transmission of the fiber wires inside the cable as described for FIG. 2A. For example, the cable can include metal wires for allowing the at least one processor to send commands or control signals to the connector 102 through the metal wires for controlling the operations inside the connector 102. In FIG. 2B, the connector 101 can also have LED or RGB LED to emit visible lights to the cable, and the at least one processor can send command or control signal to the connector 101 to turn on the LED or RGB LED inside the connector 101. Other operations described in FIG. 2B can be achieved in a similar way as in FIG. 2A, and therefore it will not be described further, The above disclosure is related to the detailed technical contents and inventive features thereof. People skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An adaptor for connecting with a cable assembly having a first connector, a second connector and a cable connecting with the first connector and the second connector, wherein the cable is located between the first connector and the second connector, said adaptor comprising:
    a first interface, for connecting with a first external device;
    a second interface, for connecting with the first connector, wherein the second interface is capable of coupling to a second external device through the first connector, the cable, and the second connector, the cable comprising at least one fiber wire for transferring data between the first external device and the second external device; and
    at least one circuit board, wherein a plurality of devices are disposed on the at least one circuit board to form a circuitry, wherein the circuitry comprises at least one processor and a wireless device, wherein the at least one processor is capable of communicating with a third external mobile device via a wireless connection between the wireless device and the third external mobile device, wherein said third external mobile device is capable of sending a command to the at least one processor via the wireless connection to perform an operation associated with the transmission of the at least one fiber wire or said data, wherein said data is capable of being transferred between the first external device and the second external device when the third external mobile device is not present.

2. The adaptor as claimed in claim 1, wherein an application (APP) running on the third external mobile device sends the command to the at least one processor via the wireless connection to perform the operation associated with the transmission of the at least one fiber wire or said data.

3. The adaptor as claimed in claim 1, wherein the first external device is a video source device and the second external device is a display device, wherein the video source device transfers video data to the display device through the adaptor, the first connector, the cable, and the second connector, wherein each of the first connector of the cable assembly and the adaptor conforms to a standard HDMI connector.

4. The adaptor as claimed in claim 1, wherein the first external device is a display device and the second external device is a video source device, wherein the display device receives video data from a video source device through the second connector, the cable, the first connector, and the adaptor, wherein each of the first connector of the cable assembly and the adaptor conforms to a standard HDMI connector.

5. The adaptor as claimed in claim 2, wherein the first connector of the cable assembly comprises a first LED, wherein the APP sends the command to the at least one processor via the wireless connection to turn on the first LED through the second interface for emitting a visible light to a fiber wire of the cable.

6. The adaptor as claimed in claim 1, wherein the circuitry comprises an HDMI signal sensor for determining a transfer rater of said data transferred through the first interface.

7. The adaptor as claimed in claim 3, wherein the at least one processor is capable of decoding the video data to enable parental control on whether to transmitting the video data to the cable or not.

8. The adaptor as claimed in claim 3, wherein the at least one processor is capable of adding video frames to enhance features for playing 3D or VR (Virtual Reality) video.

9. The adaptor as claimed in claim 2, wherein the APP running on the third external mobile device collects usage of the video data and stored in remote servers.

10. The adaptor as claimed in claim 2, wherein the first connector of the cable assembly comprises a first LED, wherein when the adaptor connects with the first external device, the APP sends the command to the at least one processor to turn on the first LED to light up the cable.

11. The adaptor as claimed in claim 1, wherein the at least one processor and the wireless device are integrated into a single IC.

12. The adaptor as claimed in claim 1, wherein the at least one circuit board is a single printed circuit board (PCB).

13. A cable assembly having a first connector, a second connector and a cable connecting with the first connector and the second connector, wherein the cable is located between the first connector and the second connector, said first connector comprising a first interface, for connecting with a first external device;
 a second interface, connecting with the cable, wherein the second interface is capable of coupling to a second external device through the cable and the second connector, the cable comprising at least one fiber wire for transferring data between the first external device and the second external device; and
 at least one circuit board, wherein a plurality of devices are disposed on the at least one circuit board to form a circuitry, wherein the circuitry comprises at least one processor and a wireless device, wherein the at least one processor is capable of communicating with a third external mobile device via a wireless connection between the wireless device and the third external mobile device, wherein said third external mobile device is capable of sending a command to the at least one processor via the wireless connection to perform an operation associated with the transmission of the at least one fiber wire or said data, wherein said data is capable of being transferred between the first external device and the second external device when the third external mobile device is not present.

14. The cable assembly as claimed in claim 13, wherein an application (APP) running on the third external mobile device sends the command to the at least one processor via the wireless connection to perform the operation associated with the transmission of the at least one fiber wire or said data.

15. The cable assembly as claimed in claim 13, wherein the first external device is a video source device and the second external device is a display device, wherein the video source device transfers video data to the display device through the first connector, the cable and the second connector, wherein each of the first connector and the second connector of the cable assembly conforms to a standard HDMI connector.

16. The cable assembly as claimed in claim 13, wherein the first external device is a display device and the second external device is a video source device, wherein the display device receives video data from a video source device through the second connector, the cable and the first connector, wherein each of the first connector and the second connector of the cable assembly conforms to a standard HDMI connector.

17. The cable assembly as claimed in claim 14, wherein the first connector of the cable assembly comprises a first LED, wherein the APP sends the command to the at least one processor via the wireless connection to turn on the first LED through the second interface for emitting a visible light to a fiber wire of the cable.

18. The adaptor cable assembly as claimed in claim 13, wherein the circuitry comprises an HDMI signal sensor for determining a transfer rater of said data transferred through the first interface.

* * * * *